United States Patent
Guigne

[11] Patent Number: 6,160,756
[45] Date of Patent: Dec. 12, 2000

[54] SEABED SONAR MATRIX SYSTEM

[75] Inventor: Jacques Y. Guigne, Paradise, Canada

[73] Assignee: Guigné International Limited, Paradise, Canada

[21] Appl. No.: 09/097,885

[22] Filed: Jun. 15, 1998

[51] Int. Cl.$^7$ .................................................. G01S 15/89
[52] U.S. Cl. ........................ 367/88; 367/106; 367/107; 367/131; 367/153
[58] Field of Search .............................. 367/87, 88, 153, 367/154, 131, 106, 107, 110, 111, 130

[56] References Cited

U.S. PATENT DOCUMENTS

| | | |
|---|---|---|
| 3,614,719 | 10/1971 | Treacy . |
| 3,786,405 | 1/1974 | Chramiec et al. . |
| 3,840,875 | 10/1974 | Neal ........................................ 342/175 |
| 3,854,060 | 12/1974 | Cook . |
| 3,870,988 | 3/1975 | Turner . |
| 3,952,280 | 4/1976 | Altes . |
| 4,219,889 | 8/1980 | Parssinen et al. ....................... 367/154 |
| 4,398,275 | 8/1983 | Zehner . |
| 4,458,342 | 7/1984 | Tournois ................................... 367/88 |
| 4,924,449 | 5/1990 | Guigne . |
| 5,200,931 | 4/1993 | Kosalos et al. ........................... 367/88 |
| 5,251,186 | 10/1993 | Lockwood . |
| 5,309,765 | 5/1994 | Horigome et al. . |
| 5,805,525 | 9/1998 | Sabol et al. ............................... 367/87 |
| 5,930,199 | 7/1999 | Wilk ......................................... 367/88 |

*Primary Examiner*—Ian J. Lobo
*Attorney, Agent, or Firm*—Leon D. Rosen

[57] ABSTRACT

A system for sonically probing a seabed comprises at least one row of transducers that each can produce a sonic beam, and a corresponding row of sonic detectors. Each transducer is independently energized to produce a narrow sonic beam, with resulting seabed or subsea echoes being detected to produce one pixel of a display formed by an X-Y array of pixels, before a next transducer is energized and its echoes are detected to produce another pixel of the display. When the system detects a large change in echo amplitude at adjacent seabed locations, then scanning at those locations is accentuated by analysis and by additional sonificiation at different frequencies. The transducers are closely spaced, at a center-to-center distance of typically about 3.5 cm, to provide good horizontal resolution. Each transducer is energized to produce a sonic pulse which, dependent on the application, has a carrier frequency of 0.25 MHz. This results in an optimized narrow sonic beam, with each pulse having a duration on the order of 10 to 100 microseconds to produce a modulation frequency on the order of 200 kHz to 5 Khz, and with each pulse having a high maximum energy to create a wide frequency bandwidth in the seabed.

16 Claims, 5 Drawing Sheets

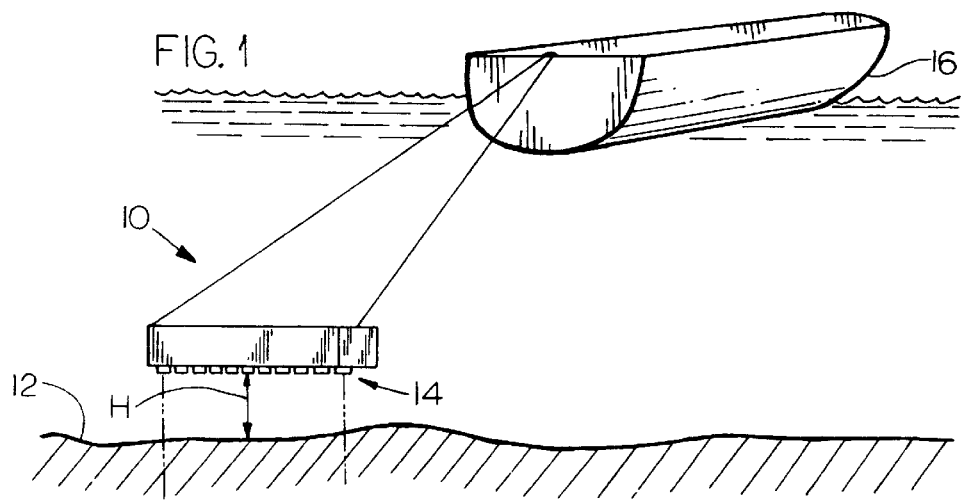
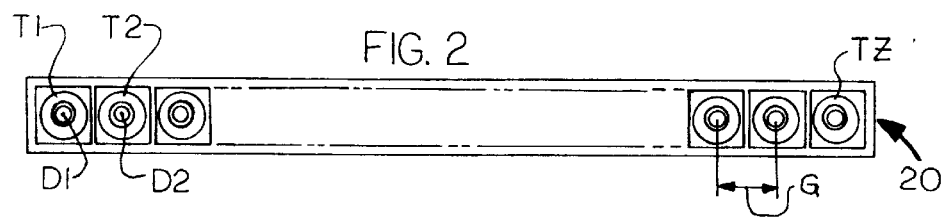
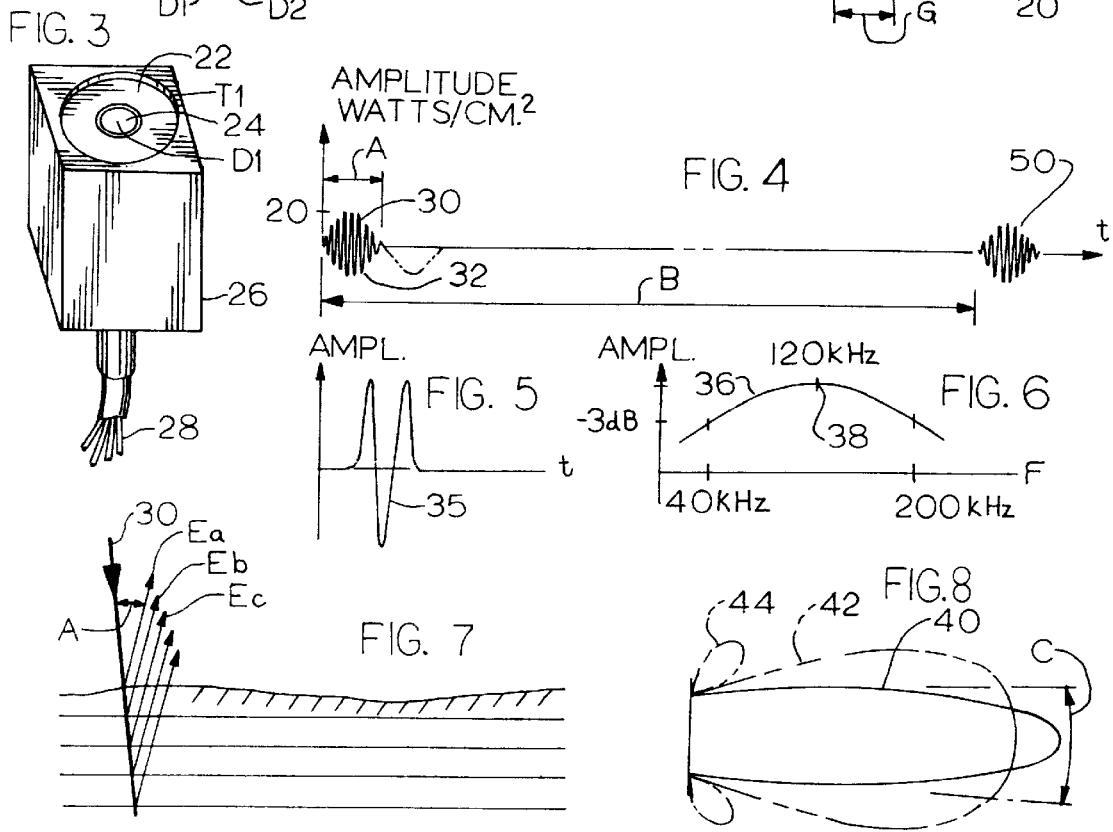

SEABED SONAR MATRIX SYSTEM

BACKGROUND OF THE INVENTION

Most sonar systems include a single transducer lying many meters above the seafloor, to produce sonic beams resulting in sonic echoes from objects in the water or on the seafloor. By repeatedly transmitting sonic pulses and detecting the echoes as the sonar system moves, a technician seeks to detect changes indicating the presence of an object. Such systems generally cannot detect small objects lying at or under the seafloor, or provide detailed information as to the characteristics of the object such as its size, its density profile, etc. My earlier U.S. Pat. No. 4,924,449 describes a method for probing the seafloor, which includes a stationary platform and a transducer that can be moved to any one of several different locations on the stationary platform. At each location, the transducer generates a sonic beam and detects the echo from that beam, before being moved to another location. While this approach enables detection of seabed characteristics at several specific locations, it does not enable the rapid generation of a display that enables a person to visualize characteristics of a seafloor area so as to pick out areas of interest or to obtain an understanding of the vitality for flora and fauna, of a seabed area. A system for probing a seabed, which created signals and usually a display, indicating fine details of a seabed, would enable a better assessment of the quality and unique characteristics of a seabed and better detection of areas of interest, which are usually man-made and geological objects of interest, such as breaks in pipelines and cables, buried mines, and buried boulders.

SUMMARY OF THE INVENTION

In accordance with one embodiment of the present invention, an apparatus and method are provided for evaluating regions at and under a seafloor, which provides signals representing seafloor characteristics along numerous closely spaced primarily vertical lines. The apparatus includes a linear array of closely spaced (preferably spaced no more than 25 cm apart) transducer devices that is moved perpendicular to the line of the array to create the equivalent of an X-Y array, or includes an actual X-Y array. Each transducer device is briefly energized to produce a narrow sonic beam that is directed at a small area of the seabed. Echoes from that beam are detected, and thereafter another transducer is energized to produce a sonic beam that is directed on an adjacent area of the seabed, etc.

The apparatus can use the echo signals to generate a display having three axes, including numerous lines extending along parallel planes, where each line represents an echo from a single pulse of a single transducer of an array. A second axis can represent different depths or different frequencies at a particular depth. A third axis that is largely vertical can represent the overall amplitude of the echo at different depths or the amplitude of different echo frequencies at a particular depth within the seafloor. The display of echoes from the transducers of the array enables a person to detect anomalies that may indicate objects or the condition of areas of interest.

Each sonic pulse includes a carrier of high frequency that is preferably at least 250 kHz, with each pulse length being on the order of magnitude of 10 microseconds, and with each sonic pulse having a peak energy of about 0.5 to 5 watts per square centimeter of transducer face. The high frequency carrier produces a narrow sonic beam, the duration of the pulse determines the center frequency of the frequency band produced by the high energy pulse passing through water, while the high energy of the pulse creates a transformation to a wide frequency band by water. The echoes can be automatically analyzed to detect anomalies, as by detecting a large change in amplitude (of all frequencies combined) with vertical depth or horizontal position, or to detect a large change in amplitude at a particular frequency of closely spaced locations in the seabed. A detection of large amplitude at a particular frequency or large changes in amplitude at a particular frequency with small changes in depth or horizontal position, can be used to change the duration of the pulses produced by the transducers, so more energy of a frequency of interest (narrowed bandwidth) is produced.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of apparatus for sensing regions at and under the seabed, including a sonic transmitter and detector device and a towing vehicle.

FIG. 2 is a bottom view of the transmitter and detector device, or array, of FIG. 2.

FIG. 3 is an isometric view of one of the transducers of the array of FIG. 2.

FIG. 4 is a graph showing variation in amplitude with time of sonic pulses produced by the array of FIG. 2.

FIG. 5 is a graph showing variation in amplitude with time of each pulse of FIG. 4 after it has traveled through water.

FIG. 6 is a graph showing variation in amplitude with frequency of the pulse of FIG. 5.

FIG. 7 is a diagram indicating parts of an echo produced at different depths within a seafloor, by a single sonic pulse.

FIG. 8 is a diagram showing one of the pulses in water, and showing, in phantom lines, a pulse of a common prior art sonar system.

DESCRIPTION OF THE PREFERRED EMBODIMENTS

Figure 9:
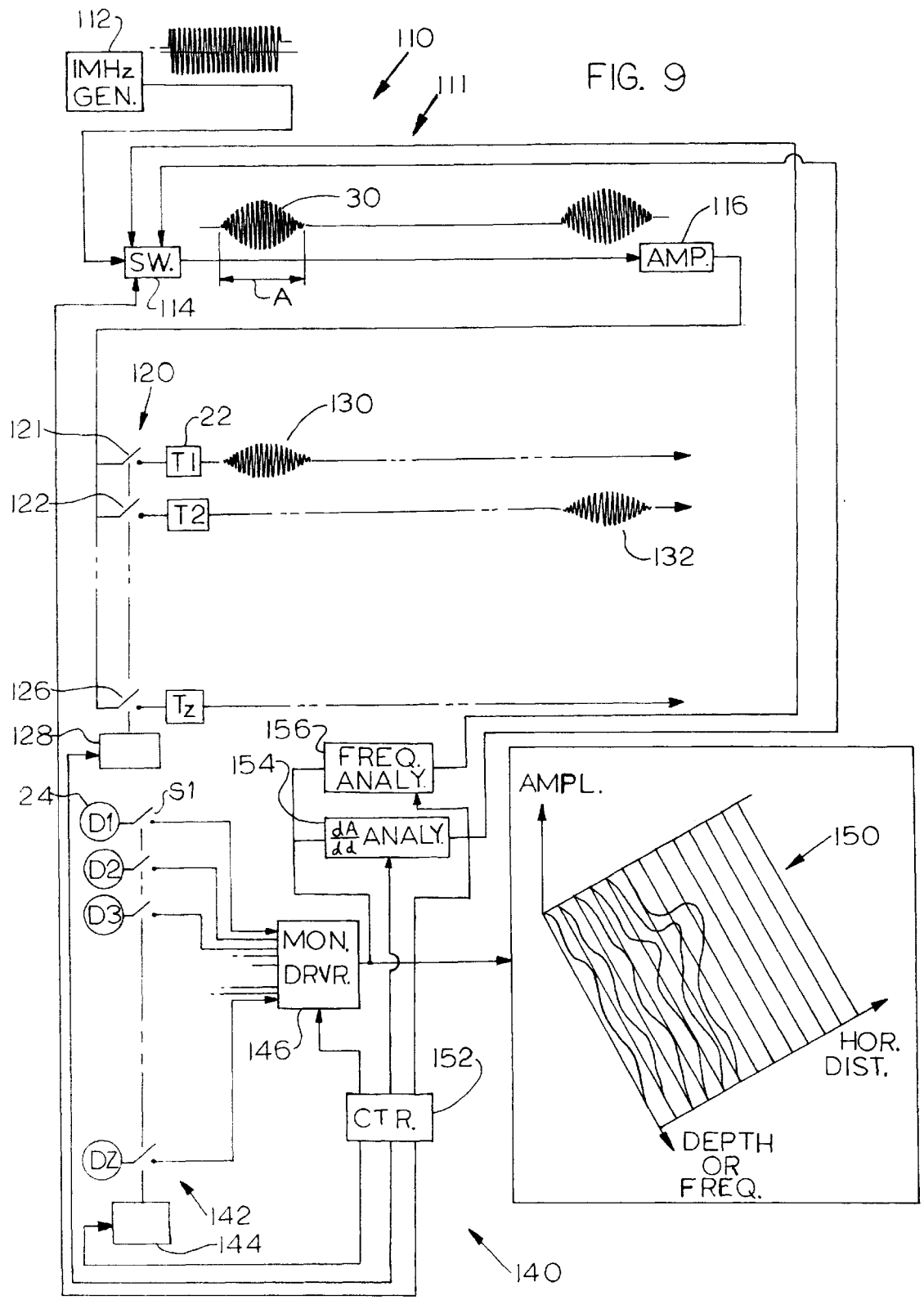
FIG. 9 is a schematic diagram of circuitry that can be used to operate the apparatus of FIG. 1.

FIG. 1 illustrates apparatus 10 for sensing regions at and under the seafloor 12. The apparatus includes a linear array 14 (a row) of sonic transmitters (at least four, and detectors, and a vehicle such as a ship 16 for towing the array. The height H of the array above the seafloor is preferably no more than two meters, and this height can be maintained constant by a variable buoyancy chamber etc. FIG. 2 shows the bottom of the array, showing that it includes a row 20 of sonic transducers each designed to produce narrow sonic beam in water, the transducer being labeled T1, T2, up to TZ. The center-to-center spacing G of the transducers is no more than 25 centimeters and preferably no more than 10 centimeters, in order to detect the characteristics of closely-spaced regions of the seabed. The transducers produce narrow beams, and a greater spacing would leave large areas between beams, that are not investigated. This particular array also has a row of sonic detectors labeled D1, D2, up to SZ. FIG. 3 shows that for the particular array shown, each sonic transducer 22 such as T1, lies around a corresponding detector 24 such as D1, with the assembly 26 having an electrical cable with wires 28 extending therefrom. The transducer 22 can be formed of piezoelectric material which can generate sound corresponding to electrical energy delivered to the transducer. Applicant prefers ring-shaped transducers of this type each having a diameter of about 2.5 centimeters, and spaces them by about 3.5 centimeters.

FIG. 7 indicates the manner in which each transducer probes the seafloor or seabed 12 or objects on it. At a given initial instant, one transducer produces a sonic pulse 30 which passes through the water and into the seabed. The sonic pulse produces numerous echo parts Ea, Eb, Ec, etc at different depths from the seafloor, and these echo parts arrive at a sonic detector at different times. Actually, the echo is part of a continuous time history. Also, the angle A is almost always less than 30° and preferably is close to zero (most preferably less than 10°) to a line perpendicular to the seabed. The detector lies adjacent to (and preferably within) the transmitting transducer. FIG. 4 shows sonic pulses 30 that are generated by the transducer. Each sonic pulse includes a carrier frequency 32 of at least 0.125 MHz, for the purpose of producing a narrow beam, that is, one with a small spread angle of much less than 5°. Applicant prefers to use a carrier frequency preferably between 250 kHz and 2 MHz to produce a very wide band width beam with a spread angle of about one to two degrees, so that only a narrow vertical region of the seabed is probed by each sonic pulse. The maximum amplitude of the pulse produced in water, is more than about one watt per square centimeter of the transducer face, so the water will produce a transformation of the pulse. It is generally unnecessary to use more than about five watts per square cm to do this. FIG. 5 shows the energetic pulse 34 as it is transformed by the water from the pulse 30 of FIG. 4, this transformation of an energetic pulse being known. FIG. 6 is a graph 36 showing the amplitude versus frequency characteristics of the pulse of FIG. 5. The frequency characteristics of the pulse show that it has a wide bandwidth, such as 160 kHz (40 to 200 kHz), with a center frequency 38 such as 120 kHz.

The center frequency 38 and bandwidth depend upon the duration A of the pulse 30 of FIG. 4. Where the pulse length A is about eight microseconds, the frequency characteristics are about as shown in FIG. 6. The wide frequency band results in the seabed being probed by a very wide range of frequencies. The frequencies are relatively low, usually being less than 100 kHz (usually 100 kHz to 5 kHz), so they penetrate a considerable distance such as up to one meter (or even two meters) into the seabed. FIG. 8 shows the characteristics of the beam 40 in water, produced by the pulse 30 of FIG. 4. As mentioned, the high carrier frequency (about 1 MHz) results in a very narrow beam spread angle C such as one to two degrees for the carrier This results in the secondary frequencies having similar narrow spread characteristics. This can be compared to common sonic beams 42 of a frequency such as 100 kHz which have beam spread angles many times greater than the angle C, and which also have side lobes 44 that are not present for the narrow beam of the present invention.

In the operation of the array, applicant generates the pulse 30 (FIG. 4), which lasts on the order of magnitude of eight microseconds, and applicant detects parts of the echo representing reflections in the seabed for up to a certain depth such as 0.5 meter. After a period B. applicant excites a next transducer such as T2 of the array of FIG. 2, with another pulse 50, which may be identical to the pulse 30. This typically continues until all of the transducers in the array have been energized with pulses and their echoes have been detected. Where it is desired to "sweep" the array as quickly as possible, the pulses B can be generated at periods spaced by about 1.5 milliseconds, with each next pulse being generated while the previous pulse is probing the seafloor and creating reflections. The sonic detectors are turned off during each transmittal of a pulse, and turned on only when interesting parts of an echo (i.e. up to about 2.0 meters within the seabed) are received.

Figure 13:
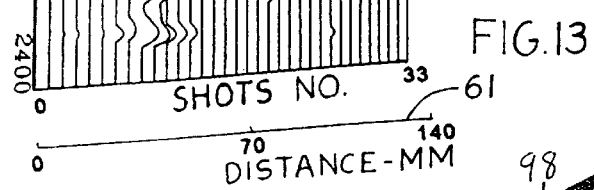
FIG. 13 is a display that applicant has generated, that shows variation in amplitude with depth, of each of a plurality of horizontally spaced echoes produced by a linear array, for a case where a flatfish lies on the seabed.

FIG. 13 shows a display 60 with three axes, with one axis 61 representing horizontally-spaced locations along the seafloor which have been probed by sonic pulses. Markings along axis 61 show that thirty four sonic pulses were generated and their echoes detected. A second axis 62 represents depth within the seafloor, at which different parts of a single echo were detected. Markings along axis 62 indicate that points at the top and bottom are spaced by about 500 microseconds, which represents about one-half meter of depth. The width (in a direction parallel to axis 62) of row D of increased amplitude, is about 10 microseconds and represents a height of about one or two centimeters. A third axis 63 represents the amplitude (of all frequencies) of each echo part. It can be seen that the display includes many primarily parallel lines, with line 71 representing the echo from a pulse produced by the first transducer T1 of the array, the next line 72 representing the echo produced by the next transducer T2 of the array, and the last line 78 representing the echo from the last transducer TZ of the array. Each echo can be the output of a single detector lying within the transducer that produced the beam that created the echo. The array of 34 transducers results in 34 largely parallel echo lines. The large increase in amplitude at E represents echo parts reflected off the seafloor. A horizontal line of increased amplitude at D represents a flatfish lying on the seabed. As the array moves horizontally, numerous subsequent displays similar to 60 can be generated. An observer quickly distinguishes lines of increased amplitude such as D, to detect objects that may be of interest. It may be noted that the lines such as 71, 72 to 78 lie in parallel planes, and that the lines can be continuous or interrupted.

Figure 14:
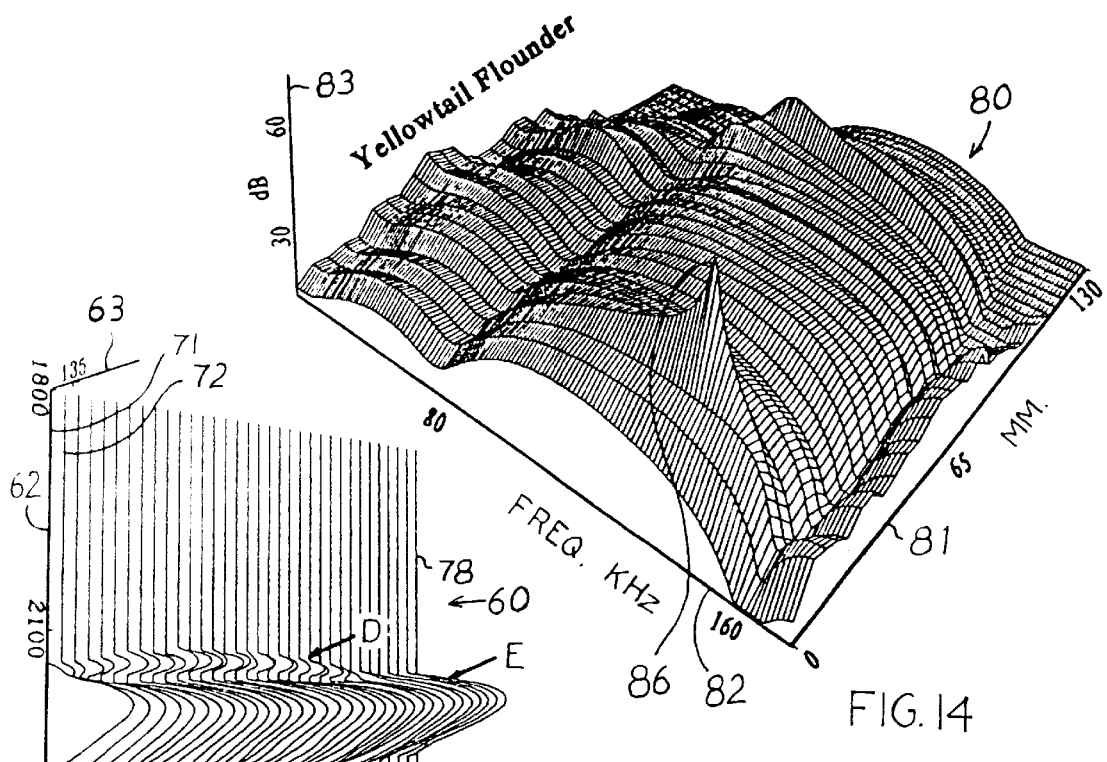
FIG. 14 is a display showing variation in echo amplitude with frequency, at a constant depth, at different horizontally-spaced locations, for the case where a yellow tail flounder lies on the seabed.

FIG. 14 includes a display 80 which has three axes 81, 82, and 83 representing three perpendicular directions. The first axis 81 represents horizontally spaced locations on and in the seafloor. Axis 82 represents variations in frequency (which are different from the variations in depth for FIG. 13). Axis 83 represents amplitude in decibels. All of the display 80 represents echo parts lying at a constant depth of a few millimeters within an object on the seafloor, this object being a yellow tail flounder. It may be noted that a point 86 of peak amplitude is shown, which is shown to be at a frequency of about 110 kHz, which indicates a large change in density within the flounder, and which can help to detect the presence of a flounder. Similar displays showing the frequency characteristics of echo parts from different depths within the seafloor along parallel lines, can be helpful in allowing a technician to identify objects of interest.

Figure 12:
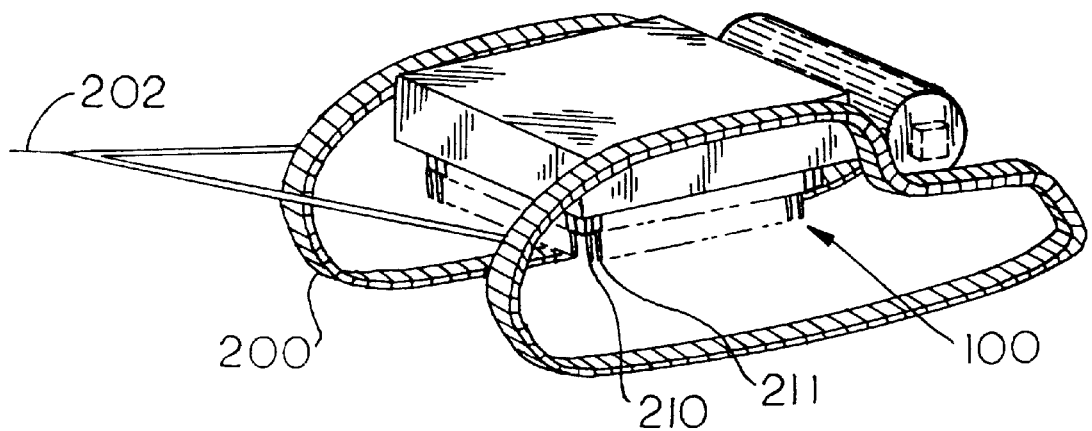
FIGS. 12 and 12A show another towed array system, that includes a two dimensional array respectively.
Figure 12A:
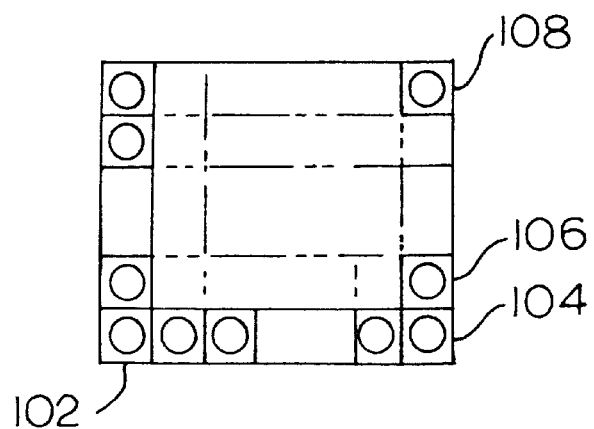
Figure 15:
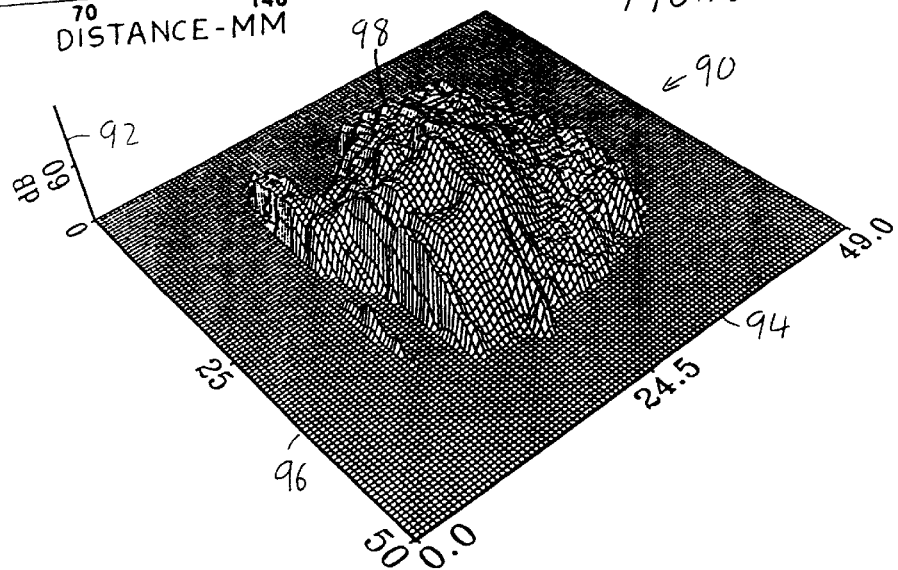
FIG. 15 is a display showing variation in overall echo amplitude along a two-dimensional array of locations spaced in two perpendicular horizontal directions, at a predetermined depth, with the depth being that at which a clam shell is resting on a sand bed.

FIG. 15 shows a display 90 produced by a two-dimensional array of the construction indicated in FIG. 12A, which includes transducers 102 arranged in a plurality of rows such as 104, 106, 108. Returning to FIG. 15, the display has an axis 92 that represents the intensity of echo parts, from a particular depth. The two horizontal axes 94, 96 represent locations in two perpendicular horizontal directions. In the display 90, an increase in amplitude at 98 represents echo parts from a clam shell resting on a sand bed. The same display can be produced after a linear array has moved a horizontal distance at a constant height above the seafloor.

FIG. 9 is a simplified view of circuitry 110 that can be used to implement the invention, although a computer controlled system is preferred and described later herein. FIG. 9 shows that the circuitry includes a portion 111 for generating sonic pulses, that includes generator 112 that generates a steady signal of 1 MHz frequency. This signal is delivered to a shaping and switching circuit 114 that passes the 1 MHz waves in pulses 30, each having a length A on the order of magnitude of ten microseconds, and preferably between four and forty microseconds length. The switch 114 generates the pulses 30 at regular intervals, such as every four milliseconds. The pulses 30 are amplified by an amplifier 116, and delivered to a switch array 120. The switch array includes numerous switches 121, 122, . . . 126 that each connects the output of the amplifier to a different one of the transducers 22 such as T1, T2, . . . TZ. A switch controller 128 closes the switches in succession, so the pulses are delivered in succession to the different transducers, at different times. Thus, sonic pulses 130, 132 in water are generated respectively by transducers T1 and T2, with the sonic pulse 132 produced by T2 being generated four milliseconds after the generation of sonic pulse 130. As discussed above, each pulse produces an echo with numerous echo parts, with the echo parts representing reflections from locations within the seabed.

Another portion 140 of the circuitry includes the sonic detectors 24 labeled D1, D2 . . . DZ Each of the sonic detectors is connected through one switch of a switch array 142 that includes a switch controller 144. In one example, each switch of the array, such as S1, is closed immediately (e.g. fifty microseconds) after a corresponding detector D1 transmits its pulse, and remains closed for three milliseconds. The detectors are connected to a memory and monitor driver 146. The monitor driver can drive a monitor to produce the display 150 which is similar to the display 60 of FIG. 13. Other portions of the circuitry includes a control 152 that controls the switch controllers 128, 144 to close the transducer switches 121 etc, in sequence and at proper times with respect to closing of the switch 114 that generates pulses, and to close each detector switch to detect parts of an echo produced by a sonic pulse from a corresponding transducer.

A first analyzer 154 indicates areas of the display 150 that have the highest amplitude and/or the greatest derivative (greatest change in amplitude per unit time of the echo, or greatest change between corresponding parts of echoes from adjacent transducers). The output of analyzer 154 can, for example, sound a buzz or generate an arrow on the display to alert a technician of an area of interest. A second analyzer 156 is a frequency analyzer that detects which frequency(s) has the largest amplitude or the largest amplitude-depth derivative. The frequency analyzer 154 can control the switch 114 to change the duration A of the pulses. For example, if the center frequency is 120 kHz, but the greatest amplitude was detected at 170 kHz, then the length of the pulse 130 in FIG. 9 can be shortened to perhaps six microseconds, to produce a center frequency of about 170 kHz Similarly, if the greatest amplitude was detected at 80 kHz, then the length of the pulse can be increased to 13 microseconds to produce a center frequency of about 80 kHz.

Figure 10:
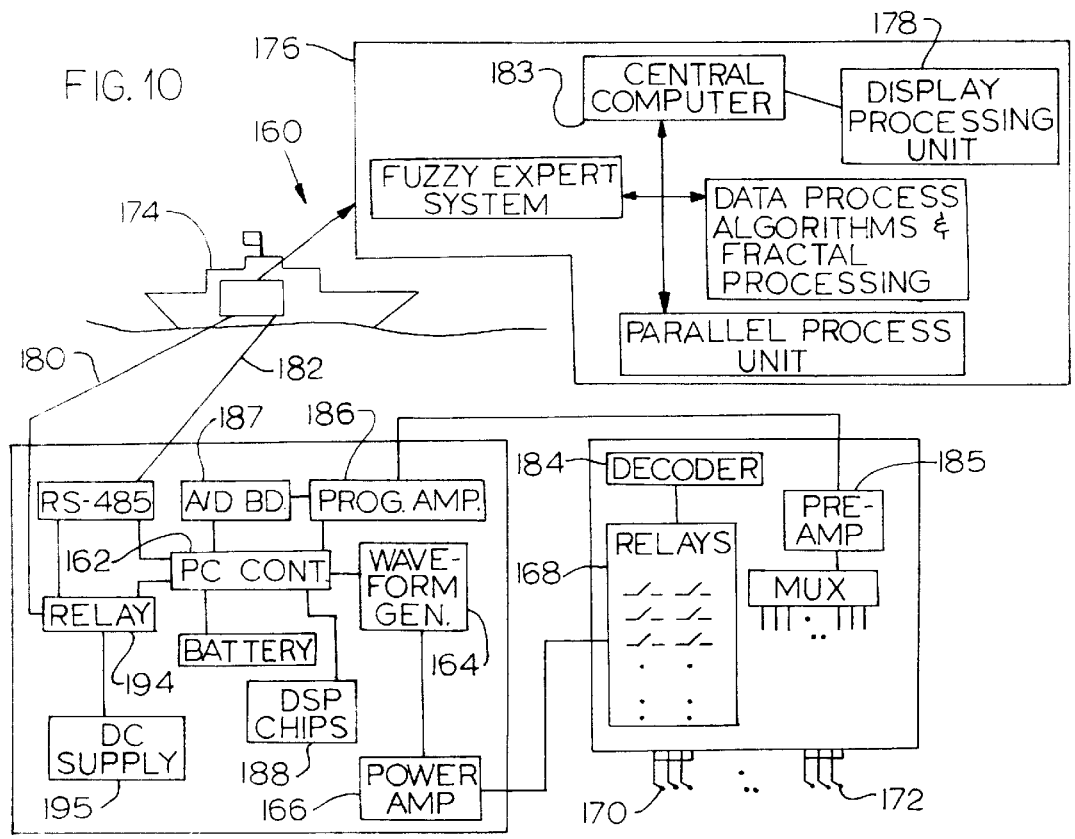
FIG. 10 is a block diagram of other circuitry that applicant has constructed, and which substitutes for the circuitry of FIG. 9.

FIG. 10 shows preferred circuitry 160 that includes a PC controller 162 that controls a microprocessor-controlled signal wave form generator 164. The output of the generator 164 passes through an amplifier 166 to a relay complex 168 which delivers pulses to transducers indicated at 170. Sonic detectors are indicated at 172. Their outputs are amplified and delivered to equipment on board a ship 174. A circuit arrangement 176 on the ship includes a display processing unit 178 that creates displays of the type shown in FIGS. 13–15. The ship delivers power over line 180 to circuitry that accompanies the array, and receives signals representing the echoes, over a line 182.

To start a sonic probing the onboard circuit arrangement sends a "handshaking" signal through the RS-485 long distance communication lines to the PC controller 162. The PC controller directs relay 194, allowing 120V or 240V power to be applied to dc power supply 195 which then provides dc power to the rest of the underwater system.

To transmit a signal, a central computer 183 sends the required information, such as waveform frequency and amplitude, to the PC controller 162. The PC controller then sends this information to the microprocessor controlled signal waveform generator 164. The PC controller also sends a trigger signal to the waveform generator. The waveform generator produces the desired waveform which is then amplified by the power amplifier 166. The amplified waveform is applied to the selected transmitter(s) or transducers through the corresponding relay(s) 168. The relay(s) is selected through decoder 184 under the direction of the PC controller 162. Signal(s) are picked up by the receiver(s), or detectors, corresponding to the active transmitter(s). The signal(s) is amplified by preamplifier 185 and a programmable gain amplifier 186. This analog signal is then converted to a digital signal by A/D board 187. The digital signal is sent to DSP chips 188 where the data undergoes such operations as filtering and compression before it is sent to a recorder or display on the ship by the PC controller.

Figure 11:
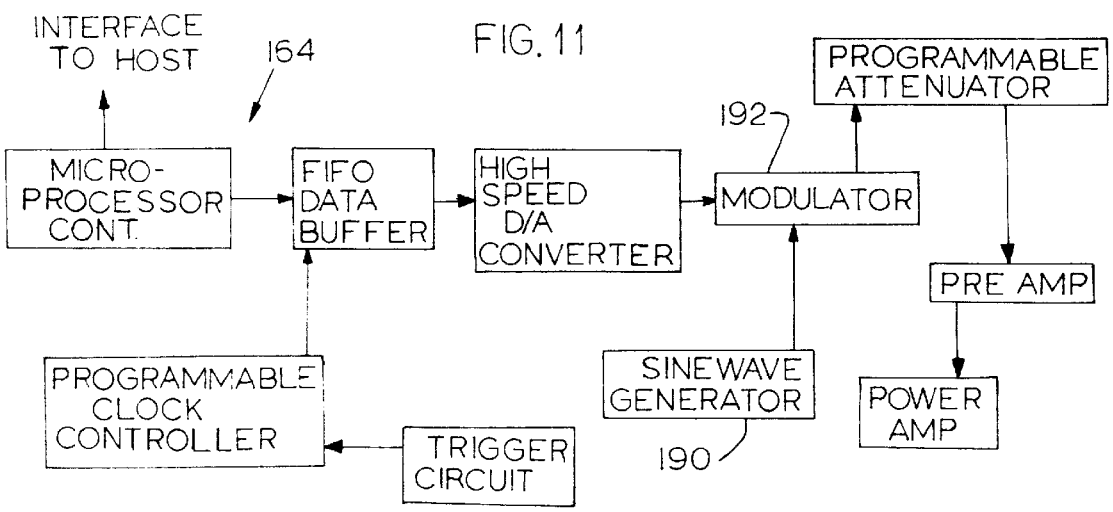
FIG. 11 is a block diagram of a microprocessor controlled signal wave form generator of the circuitry of FIG. 10.

FIG. 11 shows details of the microprocessor 164 of FIG. 10, including a sinewave generator 190 similar to the generator 112 in FIG. 9, and a modulator 192 corresponding to the switch 114 of FIG. 9.

As described above, FIG. 12 shows a two dimensional array 100 of transducers. This array is carried by a sled 200 which is towed by a tow line 202 connected to a ship. The array 100 preferably lies as dose as possible to the seafloor, without scraping the seafloor. The height is less than ten meters, is preferably no more than two meters, is more preferably no more than one meter, and is most preferably less than 0.5 meter, to minimize dissipation of the sonic pulses in water. As the array 100 moves above the seafloor, rows such as 210, 211, etc can be energized in sequence, with perhaps 1.5 milliseconds between energization of each transducer of a row, so where there are 20 transducers in a row it requires about 30 milliseconds to energize all transducers separately and separately detect their echoes. The echoes can be analyzed and the pulses produced by the next row of transducers can be altered as described above. It is possible to tow the array 100 very slowly, with the echoes from each row of transducers indicating the amplitude (of all frequencies) in two horizontal directions, at each of numerous depths within the seafloor (or of objects on the seafloor).

Applicant finds that an important use for the array is in evaluating the vitality of an area of the seabed. If there are a large number of random structures or "chaos" in the display indicating chaos in the subsea bed, this indicates that the density varies in depth and horizontal directions, indicating a healthy ecosystem. A largely uniform echo indicates an unhealthy ecosystem.

Thus, the invention provides apparatus for sensing regions under a seafloor, which can provide a technician with a good appreciation of the presence of objects on or under the seafloor, or the ecological quality of a seafloor habitat. The apparatus includes an array comprising a plurality of transducers that each can generate a sonic beam, and at least one and preferably a row of sonic detectors for detecting echoes. Circuitry connected to the transducers energizes them one at a time with pulses to generate a narrow sonic beam, so the area penetrated by each sonic beam of the array, is spaced from areas penetrated by beams from other transducers. The transducers are arranged in at least one row, where the centers of the transducers are spaced by no more than 25 centimeters so the array provides a fine evaluation of the seafloor. Each pulse has a carrier frequency of at least 0.4 megahertz to generate a narrow beam, with the lower frequency components of the transformed beam penetrating the seafloor and producing the echoes. The array is preferably slowly moved along the seafloor, so a large area of the seafloor can be evaluated. The apparatus and method are useful to sense the condition of the sea floor, and to detect and distinguish objects such as breaks in pipelines and cables, buried mines, and buried boulders.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for sensing characteristics of regions at and under a seafloor, comprising:

an array comprising a plurality of transducers that each can generate a sonic team, and a plurality of sonic detectors that can detect sound;

circuitry connected to said plurality of transducers to energize them one at a time with an electrical pulse to generate a narrow sonic beam, said circuitry connected to said detectors to receive signals representing a sonic echo of each sonic beam;

said plurality of transducers being arranged in at least one row wherein the centers of the transducers are spaced by no more than about 25 centimeters along said at least one row, and each of said pulses has a carrier frequency of at least 0.25 MHz to generate a narrow sonic beam;

said sonic detectors include at least three detectors and said detectors are interspersed with said transducers, with each transducer associated with an adjacent sonic detector.

2. The apparatus described in claim 1 wherein:

each of said electrical pulses has a pulse duration on the order of magnitude of 10 microseconds, and produces a pulsed sonic beam having a maximum amplitude of about 1 to 5 watts per square centimeter of transducer face.

3. The apparatus described in claim 2 wherein:

said circuitry is constructed so when the highest amplitude of frequencies detected in said first echoes is greater than said center frequency, the duration of a later second set of pulses is controlled to have a duration that is shorter than the pulse duration of a first set of sonic pulses that created said first set of echoes.

4. The apparatus described in claim 1 including:

a vehicle that is constructed to tow said row of transducers that are spaced by less than 25 cm. along said row, along a path that lies an average of no more than two meters above the seafloor, with said transducers facing downward at the seafloor and with said row extending in a direction that is primarily perpendicular to said path.

5. The apparatus described in claim 1 wherein:

said transducers are spaced by no more than 25 centimeters along said row; and including a vehicle that is constructed to tow said row of transducers that are spaced by no more than about 25 centimeters along said row, along a path that lies an average of no more than two meters above the seafloor, with said transducers facing downward at the seafloor and with said row extending in a direction that is primarily perpendicular to said path.

6. A system for sensing regions at and under a seafloor, comprising:

an array that includes a row of sonic transducers with centers spaced apart by no more than about 25 centimeters, and that also includes at least one sonic detector;

a vehicle that supports said row at a height above the seafloor of no more than two meters and that can move said row along a path above said seafloor;

circuitry connected to said transducers to energize them one at a time with a carrier frequency of at least 0.25 MHz to produce pulsed sonic beams.

7. System described in claim 6 wherein:

said at least one sonic detector includes a row of sonic detectors extending parallel to said row of sonic transducers, with each sonic detector lying adjacent to a selected sonic transducer.

8. A method for sensing regions under a seafloor, comprising:

positioning a movable array of sonic beam generating transducers, that includes a plurality of transducers having centers spaced by no more than about 25 centimeters, at a height of no more than about two meters above the seafloor with the transducers facing primarily at the seafloor, and positioning at least one sonic detector so it moves with said array;

energizing one of a plurality of transducers at a time, with a carrier wave having a frequency of at least 250 kHz to produce a sonic beam in the form of a pulse of a duration of no more than on the order of magnitude of 10 microseconds, detecting an echo of each sonic beam where each echo represents reflections of the beam at and below the seafloor, and generating electrical signals representing parts of the echo of the corresponding beam.

9. The method described in claim 8 wherin:

said step of energizing one of a plurality of transducers and energizing each of the other of said plurality of transducers, to produce a short pulse, includes generating a carrier signal of a frequency of at least 0.4 MHz and modulating said carrier frequency by about a half wavelength of a lower frequency to produce an electrical pulse having a duration of 4 to 40 microseconds, and with an amplitude that produces a peak sonic beam output of at least one watt per square centimeter, to create a sonic beam in the seafloor that has a frequency band with a center frequency of about 25 kHz to 250 kHz.

10. Apparatus for sensing characteristics of regions at and under a seafloor, comprising:

an array comprising a plurality of transducers that each can generate a sonic beam, said array including at least one sonic detector that can detect sound;

circuitry connected to said plurality of transducers to energize them one at a time with an electrical pulse to generate a narrow sonic beam, said circuitry connected to said at least one detector to receive signals representing a sonic echo of each sonic beam produced by one of said transducers;

said plurality of transducers being arranged in at least one row wherein the centers of the transducers are spaced by no more than about 25 centimeters along said at least one row, and each of said pulses has a carrier frequency of at least 0.25 MHz to generate a narrow sonic beam;

said circuitry includes a first portion constructed to generate signals representing the amplitude of each of a plurality of different frequencies of echoes from each of a first set of sonic beams, and a second portion which varies the energization of said transducers to produce a second set of pulses and a second corresponding set of sonic beams that each includes an increased amplitude of those echo frequencies which had a higher than average amplitude in the first set of echoes, whereby to maximize the outputs of those transducers which produce echoes of highest amplitude.

11. A system for sensing regions at and under a seafloor, comprising:

an array that includes a row of sonic transducers with centers spaced apart by no more than about 25 centimeters, and that also includes at least one sonic detector;

a vehicle that supports said row at a height above the seafloor of no more than two meters and that can move said row along a path above said seafloor;

circuitry connected to said transducers to energize them to produce pulsed sonic beams, said circuitry connected to said at least one sonic detector and constructed to generate a display with trace lines each representing at least the amplitude of echo parts resulting from each sonic beam, for sonic beams produced by each of a plurality of said transducers of said row;

said circuitry includes a display having three axes oriented to represent three primarily perpendicular directions, and a circuit that produces trace lines on said display that represent echoes from pulses produced by said transducers, wherein each trace line has positions at points spaced along a second of said axes representing the time of detecting a particular echo after generation of the corresponding sonic pulse, and wherein each trace has positions along a third of said axes representing the amplitude of the echo at the corresponding time position;

said trace lines being spaced along a first of said axis with each of a plurality of said trace line represents echoes from a sonic beam pulse generated by a different one of said transducers.

12. The system described in claim 11 wherein:

said at least one sonic detector includes a plurality of sonic detectors.

13. A method for sensing regions under a seafloor, comprising:

positioning a movable array of sonic beam generating transducers, that includes a plurality of transducers having centers spaced by no more than about 25 centimeters, at a height of no more than about two meters above the seafloor with the transducers facing primarily at the seafloor, and positioning at least one sonic detector so it moves with said array;

energizing one of a plurality of transducers at a time, with a carrier wave having a frequency of at least 250 kHz to produce a sonic beam in the form of a pulse of a duration of no more than on the order of magnitude of 10 microseconds, detecting an echo of each sonic beam where each echo represents reflections of the beam at and below the seafloor, and generating electrical signals representing parts of the echo of the corresponding beam;

generating a display that has three axes oriented to represent three primarily perpendicular directions, including marking trace lines on said display that each represents an echo resulting from a pulse produced by one of said transducers with said trace lines lying in parallel planes, wherein each trace line has positions at points spaced along a second of said axes representing the time of detection of a part of an echo after generation of the corresponding sonic beam, and wherein each trace has a position along a third of said axes representing an amplitude of a characteristic of the echo at the corresponding time.

14. The method described in claim 13 wherein:

said positions along said third axis represent the overall amplitude of the part of the echo.

15. The method described in claim 13 wherein:

said positions along said third axis represent the center frequency of the part of the echo.

16. Apparatus for sensing characteristics of regions at and under a seafloor, comprising:

an array comprising a plurality of transducers that each can generate a sonic beam, and at least three sonic detectors that are interspersed with said transducers and that can detect sound;

circuitry connected to said plurality of transducers to energize them one at a time with an electrical pulse to generate a narrow sonic beam, said circuitry connected to said at least one detector to receive signals representing a sonic echo of each sonic beam produced by one of said transducers;

said plurality of transducers being arranged in at least one row and spaced by no more than about 25 centimeters along said row, and each of said pulses has a carrier frequency of at least 250 kHz to generate a narrow sonic beam.

* * * * *